United States Patent
Ozawa

(10) Patent No.: US 9,602,621 B2
(45) Date of Patent: Mar. 21, 2017

(54) DELIVERY NETWORK, SERVER, AND DELIVERY METHOD

(75) Inventor: Kazunori Ozawa, Tokyo (JP)

(73) Assignee: Rakuten, Inc., Tokyo (JP)

(*) Notice: Subject to any disclaimer, the term of this patent is extended or adjusted under 35 U.S.C. 154(b) by 292 days.

(21) Appl. No.: 14/344,497

(22) PCT Filed: Sep. 14, 2012

(86) PCT No.: PCT/JP2012/073714
§ 371 (c)(1),
(2), (4) Date: Mar. 12, 2014

(87) PCT Pub. No.: WO2013/042636
PCT Pub. Date: Mar. 28, 2013

(65) Prior Publication Data
US 2015/0012586 A1    Jan. 8, 2015

(30) Foreign Application Priority Data
Sep. 21, 2011  (JP) .................. 2011-205463

(51) Int. Cl.
*G06F 15/16* (2006.01)
*H04L 29/08* (2006.01)
(Continued)

(52) U.S. Cl.
CPC .......... *H04L 67/2847* (2013.01); *G06F 21/10* (2013.01); *H04L 47/11* (2013.01);
(Continued)

(58) Field of Classification Search
CPC ..... H04L 67/2847; H04L 47/11; H04L 67/42; G06F 21/10; H04N 21/64738;
(Continued)

(56) References Cited

U.S. PATENT DOCUMENTS

2004/0098748 A1* 5/2004 Bo .................. H04N 7/17336
  725/105
2005/0076136 A1* 4/2005 Cho ................ H04L 29/06027
  709/231
(Continued)

FOREIGN PATENT DOCUMENTS

JP    2005063234 A  *  3/2005
JP    2010-219802 A     9/2010
(Continued)

OTHER PUBLICATIONS

Yoshiaki Taniguchi et al, "Implementation and Evaluation of Cooperative Proxy Caching Mechanisms for Video Streaming Services", Proceedings of SPIE—International Society for optical engineering, US, vol. 5601, Jan. 1, 2004, p. 288-299 Cited in KROA.

(Continued)

*Primary Examiner* — Chris Parry
*Assistant Examiner* — Weiwei Stiltner
(74) *Attorney, Agent, or Firm* — Sughrue Mion, PLLC

(57) ABSTRACT

In a delivery network system, deliver a server that holds requested content is determined, using information included in a content request message from a communication terminal. A file or stream of the requested content is read from the determined server. When the content is moving image content, a bandwidth of a mobile network is estimated, based on a response signal or a congestion state notification signal from the communication terminal. The moving content is transmitted by controlling a timing of transmitting the read file or the read stream so as not exceed the estimated bandwidth.

12 Claims, 6 Drawing Sheets

(51) Int. Cl.
*H04N 21/239* (2011.01)
*H04N 21/61* (2011.01)
*H04N 21/442* (2011.01)
*H04L 12/801* (2013.01)
*H04N 21/231* (2011.01)
*H04N 21/472* (2011.01)
*H04L 29/06* (2006.01)
*H04W 8/18* (2009.01)
*H04W 28/02* (2009.01)
*G06F 21/10* (2013.01)
*H04N 21/647* (2011.01)
*H04W 4/06* (2009.01)

(52) U.S. Cl.
CPC ......... *H04L 67/42* (2013.01); *H04N 21/2393* (2013.01); *H04N 21/23106* (2013.01); *H04N 21/44209* (2013.01); *H04N 21/47202* (2013.01); *H04N 21/6131* (2013.01); *H04N 21/64738* (2013.01); *H04W 8/18* (2013.01); *H04W 28/0247* (2013.01); *G06F 2221/2101* (2013.01); *H04L 47/14* (2013.01); *H04W 4/06* (2013.01)

(58) Field of Classification Search
CPC ......... H04N 21/47202; H04N 21/6131; H04N 21/2393; H04N 21/44209
USPC .................................................. 709/203–204
See application file for complete search history.

(56) References Cited

U.S. PATENT DOCUMENTS

| | | | | |
|---|---|---|---|---|
| 2006/0120326 | A1* | 6/2006 | Takeuchi | H04W 36/02 370/331 |
| 2008/0010410 | A1* | 1/2008 | Zilbershtein | H04L 67/06 711/118 |
| 2008/0091838 | A1* | 4/2008 | Miceli | H04L 12/1818 709/231 |
| 2008/0191816 | A1* | 8/2008 | Balachandran | H04L 47/10 333/24 R |
| 2008/0192710 | A1 | 8/2008 | Balachandran et al. | |
| 2008/0192820 | A1* | 8/2008 | Brooks | H04N 7/17318 375/240.02 |
| 2008/0208949 | A1 | 8/2008 | Tanaka et al. | |
| 2010/0268836 | A1 | 10/2010 | Jabri et al. | |
| 2010/0316050 | A1 | 12/2010 | Baykal et al. | |
| 2012/0218887 | A1* | 8/2012 | Khilnani | H04L 43/0876 370/230 |

FOREIGN PATENT DOCUMENTS

| | | |
|---|---|---|
| WO | 2010/106390 A1 | 9/2010 |
| WO | 2011049179 A1 | 4/2011 |
| WO | 2011057292 A1 | 5/2011 |

OTHER PUBLICATIONS

Korean Office Action for KR Application No. 10-2014-7010515 mailed on Sep. 25, 2015 with English Translation.

Extended European Search Report of EP Application No. 12832814.3 dated Feb. 23, 2015.

Kenichi Fukasawa et al. "A study on application method of caching system for mobile core network," IEICE Technical Report, The Institute of Electronics, Information and Communication Engineers, Tokyo, Japan, Feb. 24, 2011, pp. 367-370, vol. 110, No. 448, NS2010-227(Mar. 2011), with English Abstract. Concise Explanation of relevant in the translated ISR on p. 1.

Yoshiaki Taniguchi et al. "Implementation and Evaluation of Cooperative Proxy Caching System for Video Streaming Services," Technical Report of IEICE, The Institute of Electronics, Information and Communication Engineers, Tokyo, Japan, Feb. 5, 2004, pp. 13-18, vol. 103, No. 650, IN2003-190 (Feb. 2004), with English Abstract. Concise Explanation of relevant in the translated ISR on p. 1.

International Search Report for PCT Application No. PCT/JP2012/073714, mailed on Oct. 9, 2012.

* cited by examiner

DELIVERY NETWORK, SERVER, AND DELIVERY METHOD

DESCRIPTION OF RELATED APPLICATION

The present application is a National Stage Entry of PCT/JP2012/073714 filed on Sep. 14, 2012, which is based on and claims the benefit of the priority of Japanese Patent Application No. 2011-205463 (filed on Sep. 21, 2011), the disclosures of which are incorporated herein in their entirety by reference.

TECHNICAL FIELD

The present invention relates to a content delivery technology. More specifically, the invention relates to a delivery network, a server, and a delivery method.

BACKGROUND

With implementation of LTE (Long Term Evolution) and EPC (Evolved Packet Core) technologies and so forth, an increase in speed and capacity of mobile networks is expected. With the advancement of these technologies, content delivery configured to deliver content to various communication terminals including portable terminals through the networks is expected to spread in the future.

SUMMARY

The following is an analysis given by the present invention.

By the year 2013, data traffic amount is expected to increase more than eight to ten times the current amount, and video content is expected to makes up most of the data traffic amount traffic in mobile networks in the future. In addition, due to improvement of terminal capability accompanied with rapid spread of a smart phone, a tablet terminal, and so forth, a capacity of video content has been enlarged more and more. In the near future, high-definition and large-capacity content, for example, is also expected to be delivered through a mobile network.

In an example of the related art of a delivery system configured to perform content deliver on the Internet, when performing content delivery via a mobile network, for example, content requests from all communication terminals are transmitted to a delivery server on an Internet network via a packet forwarding equipment(s), and the delivery server transmits content to all the communication terminals via the packet forwarding equipment(s).

Such a configuration of the related art, however, causes the following problems.

When delivering moving image content on the Internet by the related art delivery system, the content with a constant bit rate is continuously delivered one after another, irrespective of a bandwidth (throughput) of the mobile network. As a result, there may be such a case where even future data not necessary for current viewing by a viewer will be delivered to a client (communication terminal).

Thus, there is a problem that when the viewer stops the viewing in the middle of the viewing, the data that has been already delivered and has not reproduced yet will all be wasted. In other words, this problem means that a limited bandwidth of the mobile network will be unnecessarily consumed.

Further, a bandwidth (throughput) of the mobile network temporally varies depending on a traffic amount. The related art delivery system does comply with a delivery that accommodates a throughput variation of the mobile network.

For this reason, when a period of time during which a throughput is below a delivery bit rate continues, for example, data buffered in a client (communication terminal) may be depleted. As a result, a problem arises that a moving image being played freezes or an interruption of a sound occurs in the client (communication terminal).

The present invention has therefore been made in view of the above-mentioned problems. An object of the present invention is to provide a system, a method, and a server that allow avoiding unnecessary consumption of a bandwidth of a mobile network and allow delivery which accommodates a throughput variation of a mobile network.

According to the present invention, a server configured to function as a cache server or a proxy server on a mobile network estimates the bandwidth of the mobile network, based on a response signal or a congestion state notification signal from a portable terminal. Then, the server transmits a file or a stream to be delivered to the communication terminal by controlling the timing of transmitting the file or the stream so as not to exceed the estimated bandwidth. More specifically, according to the present invention, there is provided a delivery network system comprising the servers, each server including:

a storage unit configured to temporarily store a replica of at least a portion of contents held by a delivery server, the delivery server being configured to deliver content on the Internet;

a determination unit configured to determine the server holding requested content, using information included in a content request message from the communication terminal;

a securing unit configured to read the file or the stream of the requested content from the determined server; and a delivery unit configured to estimate the bandwidth of the mobile network, based on the response signal or the congestion state notification signal from the communication terminal and transmit moving image content by controlling the timing of transmitting the read file or the read stream so as not to exceed the estimated bandwidth, when the requested content is the moving image content.

According to the present invention, there is provided a server arranged on a mobile network and configured to function as a cache server or a proxy server, the server comprising:

a storage unit configured to temporarily store a replica of at least a portion of contents held by a delivery server, the delivery server being configured to deliver content on the Internet;

a determination unit configured to determine the server or a server holding requested content, using information included in a content request message from a communication terminal;

a securing unit configured to read a file or a stream of the requested content from the determined server; and a delivery unit configured to estimate a bandwidth of the mobile network, based on a response signal or a congestion state notification signal from the communication terminal and transmit moving image content by controlling a timing of transmitting the read file or the read stream so as not to exceed the estimated bandwidth, when the requested content is the moving image content.

According to the present invention, there is provided a delivery method by a serve configured to function as a cache server or a proxy server, a plurality of the servers being provided on a mobile network, the method comprising:

temporarily storing a replica of at least a portion of contents held by a delivery server, the delivery server being configured to deliver content on the Internet;

determining the server holding requested content, using information included in a content request message from a communication terminal;

reading a file or a stream of the requested content from the determined server; and when the requested content is moving image content, estimating a bandwidth of the mobile network, based on a response signal or a congestion state notification signal from the communication terminal and transmitting the moving image content by controlling a timing of transmitting the read file or the read stream so as not to exceed the estimated bandwidth.

According to the present invention, unnecessary consumption of a bandwidth of a mobile network can be avoided, and delivery that accommodates variation of the throughput of the mobile network can be performed. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Exemplary embodiments of the present invention will be described in detail. The following describes several exemplary embodiments wherein content is a moving image, though not limited thereto.

Exemplary Embodiment 1

Figure 1:
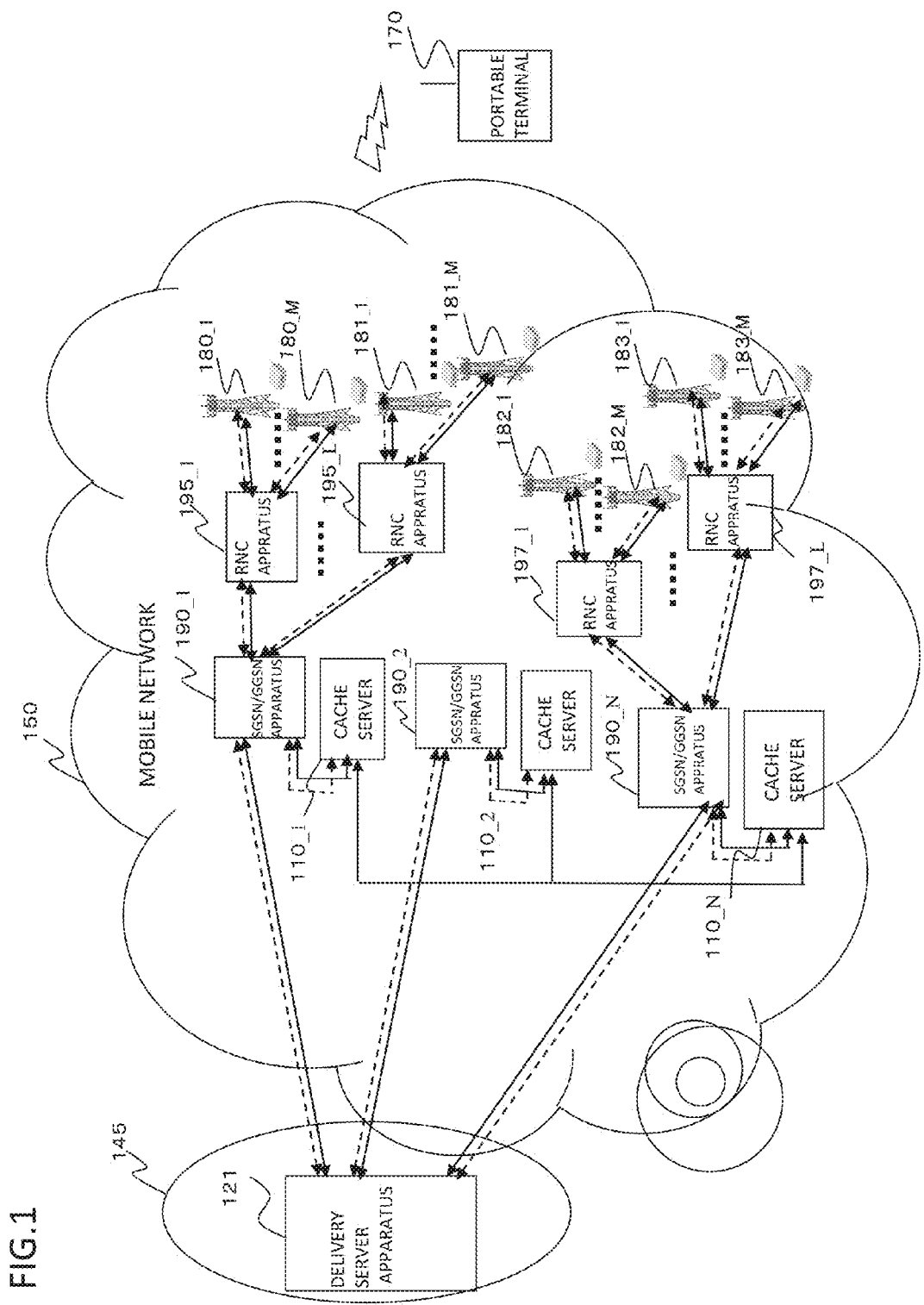
FIG. 1 is a diagram illustrating a connection configuration of a first exemplary embodiment of the present invention.

FIG. 1 is a diagram illustrating a configuration according to a first exemplary embodiment. In the present exemplary embodiment, 3G mobile network is employed as a mobile network and an SGSN/GGSN apparatus is employed as a packet forwarding apparatus. The SGSN/GGSN apparatus is a node in which functions of a serving GPRS support node (SGSN: Serving GPRS (General Packet Radio Service) Support Node) and a gateway GPRS support node (GGSN: Gateway GPRS Support Node) are integrated with each other. FIG. 1 illustrates the configuration using cache servers. A delivery server apparatus (delivery server) 121 on an Internet network 145 in FIG. 1 stores various contents on the Internet. In the following description, these contents are referred to as "OTT (Over The Top) contents". As each content, a compression encoded bit stream of the content including at least one of a moving image, a still image, an audio, a voice and so forth or a file storing the compression encoded bit stream is employed. The content such as a Web screen, software, an application, data, or the like may be employed. Though it is assumed that a portable terminal is employed as a communication terminal, other terminals may also be employed.

N (N≥2) units of SGSN/GGSN apparatuses 190_1 to 190_N are disposed on a mobile network 150. RNC (Radio Network Controller) apparatuses (radio base station control apparatuses) 195_1 to 195_L (L≥2) are connected to the SGSN/GGSN apparatus 190_1, and RNC apparatuses 197_1 to 197_L are connected to the SGSN/GGSN apparatus 190_N. L units of RNC apparatuses are connected to the SGSN/GGSN apparatus 190_2 as well. The L units of RNC apparatuses connected to the SGSN/GGSN apparatus 190_2, however, are omitted and are not shown, simply for convenience of preparation of the drawing.

Further, M (M≥2) units of base stations are connected per RNC apparatus. To take an example, the M units of base station apparatuses 180_1 to 180_M are connected to the RNC apparatus 195_1, and the M units of base station apparatuses 181_1 to 181_M are connected to the RNC apparatus 195_L. The M units of base station apparatuses 182_1 to 182_M are connected to the RNC apparatus 197_1, and the M units of base station apparatuses 183_1 to 183_M are connected to the RNC apparatus 197_L.

One unit of cache server is connected to a GGSN function unit of each SGSN/GGSN apparatus. To take an example, a cache server 110_1 is connected to the SGSN/GGSN apparatus 190_1. The SGSN/GGSN apparatus herein means to have a apparatus configuration in which an SGSN function unit and the GGSN function unit are installed at a same location.

When a portable terminal 170 describes the URL (Uniform Resource Locator) of requested content and then issues a connection request message for delivery of the requested content, the base station (one of the base stations 181_1 to 181_M in the case of FIG. 1) in the area where the portable terminal 170 is currently located receives the connection request message. Then, the connection request message is sent to the RNC apparatus (195_L in the case of FIG. 1) that controls the base station.

The RNC apparatus 195-L receives the connection request message from the base station, stores the connection request message, an IP (Internet Protocol) address for the delivery server, an IP address for the portable terminal 170, and so forth in the pay load portion of a GTP (General Packet Radio Service (GPRS) Tunneling Protocol) packet, and transfers the GTP packet to the SGSN/GGSN apparatus 190_1 that manages the RNC apparatuses 195_1 to 195_L.

Next, the SGSN/GGSN apparatus 190_1 receives the GTP packet.

The cache server 110_1 is connected to the Gi interface of the GGSN function unit of the SGSN/GGSN apparatus 190_1, for example. The cache server 110_N is connected to the Gi interface of the GGSN function unit of the SGSN/GGSN apparatus 190_N. The cache servers are connected to each other so that content association may be made.

As a representative configuration of the cache servers, a configuration of the cache server 110_1 connected to the SGSN/GGSN apparatus 190_1 will be described using FIG. 2. Herein, the other cache servers 110_2 to 110_N have the same configuration as the cache server 110_1. Thus, the description will be made, using the cache server 110_1 as the representative of the cache servers, and description of the other cache servers 110_2 to 110_N will be omitted.

Figure 2:
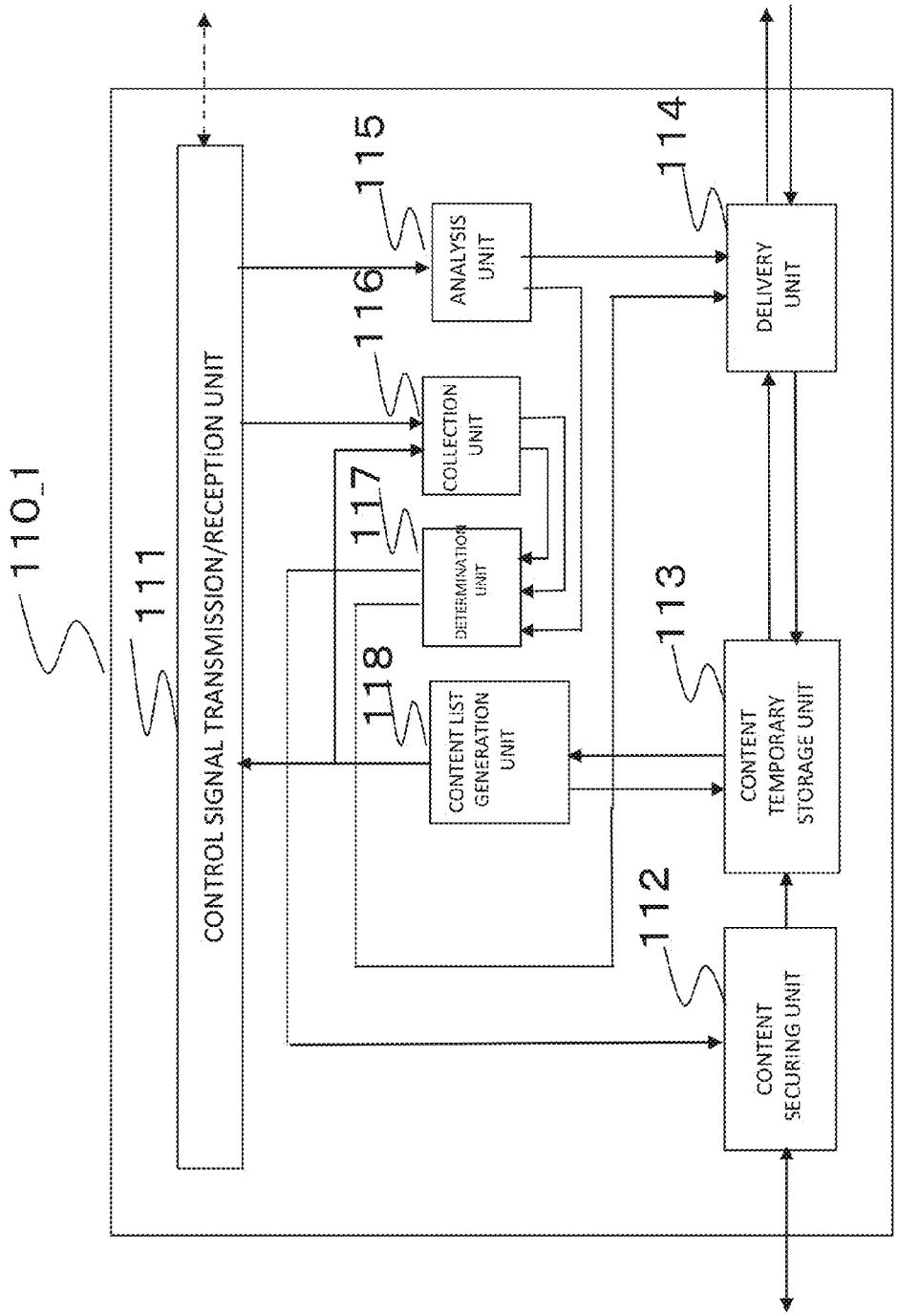
FIG. 2 is a diagram illustrating a configuration example of a cache server in the first exemplary embodiment.

Referring to FIG. 2, a control signal transmitting/reception unit 111 receives from the SGSN/GGSN apparatus 190_1 the GTP packet with the followings stored therein:
- the connection request message from the portable terminal 170;
- the reception IP address of the portable terminal;
- the URL of the requested content, and so forth.

The control signal transmitting/reception unit 111 receives from the SGSN/GGSN apparatus 190_1 visiting area information of the portable terminal 170.

An analysis unit 115 reads the following information from the received GTP packet:
- content of the connection request message stored in the payload portion of the packet.

Then, the analysis unit 115 extracts the following information:
- the reception IP address of the portable terminal 170;
- the URL of the requested content, and so forth.

The analysis unit 115 then outputs the URL of the requested content, the reception IP address of the portable terminal 170, and so forth to a delivery unit 114 and a determination unit 117.

A collection unit 116 receives the following lists:
- a content list of content stored in its own (own cache server); and
- content lists of contents stored in the other cache servers other than the own cache server.

Then, the collection unit 116 outputs the content lists to the determination unit 117.

The collection unit 116 may collect the content lists in one or a combination of the following these cases:
- for each predetermined time interval;
- when a connection request is made from the portable terminal 170; and
- when a collection request is made from the other cache server.

The determination unit 117 receives the followings:
- information of the reception IP address of the portable terminal 170, the URL of the requested content, and so forth;
- the content list of the content stored in its own (own cache server); and
- the content lists of the contents stored in the other cache servers other than the own cache server.

The determination unit 117 determines whether the content requested by the portable terminal 170 is stored in its own (cache server) or the other cache server.

When the content requested by the portable terminal 170 is stored in its own (own cache server), the determination unit 117 issues read and delivery instructions to a content temporary storage unit 113 and the delivery unit 114.

On the other hand, when the content requested by the portable terminal 170 is stored in the other cache server, the determination unit 117 informs the followings to a content securing unit 112:
- the URL of the requested content; and
- an IP address for the other cache server that stores the requested content. The determination unit 117 issues an instruction to secure the content from the other cache server by using cooperation between the cache servers.

When the requested content is not stored in its own and in any of the other cache servers other than its own (local cache server), the determination unit 117 issues to the content securing unit 112 an instruction to secure the content from the delivery server apparatus 121.

The content securing unit 112 receives the followings from the determination unit 117:
- the URL of the requested content and the instruction to secure the content;
- the IP address of the other cache server when the requested content is stored in the other cache server; and
- the IP address of the delivery server apparatus 121 when the requested content is stored in the delivery server apparatus 121. The content securing unit 112 secures a replica of the requested content and then outputs the secured replica to the content temporary storage unit 113. The content temporary storage unit 113 stores the content secured by the content securing unit 112.

When the content temporary storage unit 113 receives the instruction to read the content from the determination unit 117, the content temporary storage unit 113 reads a content file corresponding to the URL of the requested content, and then outputs the content file to the delivery unit 114.

The content list generation unit 118 generates the list of every content stored in the content temporary storage unit 113 whenever necessary, and outputs the content list in the following case:
- for each predetermined time interval;
- when a request is made from the other cache server; or
- when a request is made from the collection unit 116.

The delivery unit 114 receives information of the URL of the requested content from the analysis unit 115, receives the instruction to deliver the content from the determination unit 117, reads the file of the requested content from the content temporary storage unit 113, generates a packet in accordance with a predetermined protocol (such as a TCP (Transmission Control Protocol)), transmits the packet to the SGSN/GGSN apparatus, and then delivers the packet to the portable terminal 170 through the SGSN/GGSN apparatus.

Figure 3:
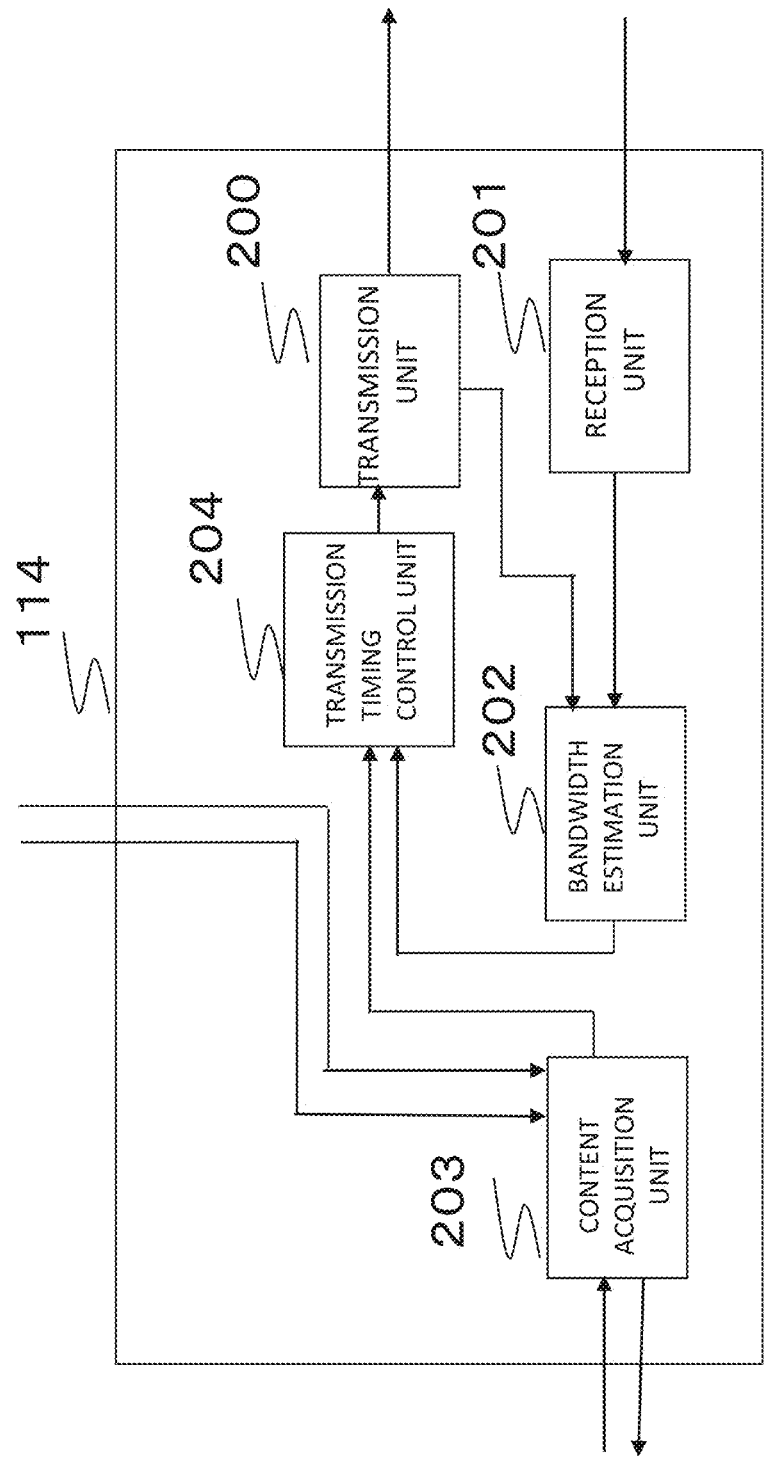
FIG. 3 is a diagram illustrating a configuration example of a delivery unit in FIG. 2.

FIG. 3 is a diagram illustrating a configuration example of the delivery unit 114 in FIG. 2. Referring to FIG. 3, a reception unit 201 receives a packet of a TCP (Transmission Control Protocol) response signal (such as the packet of a TCP: Ack (acknowledge) signal) from the portable terminal 170 through the SGSN/GGSN apparatus, and then outputs information on the packet of the TCP response signal to a bandwidth estimation unit 202.

As another arrangement, when the reception unit 201 receives from the portable terminal 170 an ECN (Explicit Congestion Notification) congestion state notification signal, the reception unit 201 issues an instruction to drastically reduce the bandwidth to the bandwidth estimation unit 202. ECN refers to a function of explicitly notifying the congestion state to an end node by a router or the like.

The bandwidth estimation unit 202 receives the following information:
- information (such as the transmission time of a transmitted packet and the size of the transmitted packet) on the transmitted packet transmitted from a transmission unit 200; and
- information on the packet of the TCP response signal. Then, the bandwidth estimation unit 202 associates the transmitted packet and the packet of the TCP response signal, using numbers for the packets, thereby measuring a response time Tn, based on the following Equation (1):

$$Tn = Tn\_ack - Tn\_send \quad (1)$$

where Tn indicates the response time of an nth packet, Tn_ack indicates a time at which an nth packet of a TCP response signal (TCP Ack packet) has been received by the reception unit 201, and Tn_send indicates a time at which the nth transmitted packet has been transmitted by the transmission unit 200.

The bandwidth estimation unit 202 estimates a bandwidth Bn of the nth transmitted packet using Equation (2) and (3) and using the size of the nth transmission packet set to Sn, based on the following equations:

$$Pn = Sn/Tn \quad (2)$$

$$Bn = (1-\alpha)*Bn-1 + \alpha*Pn \quad (3)$$

where α is a predetermined constant that satisfies 0<α<1.

Calculation of Equations (2) and (3) may be performed by the bandwidth estimation unit 202 for each predetermined time interval, or may be performed when a request is made from a content acquisition unit 203.

The bandwidth estimation unit 202 outputs to a transmission timing control unit 204 the bandwidth Bn estimated using Equation (3) for each predetermined time interval T, for example.

As another arrangement, when the ECN signal is received from the reception unit 201, it may also be so arranged that it is determined that the mobile network is in the congestion state, and the bandwidth Bn estimated using Equation (2) may be reduced just by a predetermined amount or may be set to Bn=0. Setting of Bn=0 herein means that no packet is transmitted from the transmission unit 200 during a predetermined time segment.

The content acquisition unit 203 receives the URL of the requested content from the analysis unit 115 in FIG. 2, receives the instruction to deliver the content from the determination unit 117 in FIG. 2, searches the content temporary storage unit 113 in FIG. 2 for the file of the requested content, and then acquires the corresponding file or the corresponding stream and bit rate information K. Then, the content acquisition unit 203 outputs these information to the transmission timing control unit 204.

The transmission timing control unit 204 receives the bandwidth Bn from the bandwidth estimation unit 202, receives the file or the stream of the requested content of the URL and a bit rate K of the content, and then controls a transmission timing in the following manner, for example.

When K<Bn, the content is output to the transmission unit 200 during a predetermined time segment T1. It is, however, assumed that the time segment T1 is a time segment shorter than the time interval T and that emptying of data in the buffer is not supposed to occur in the portable terminal 170 during a time segment T−T1.

When K≥Bn, the content is not output to the transmission unit 200 during a predetermined time segment T2. It is assumed, however, that the time segment T2 is a time segment during which emptying of data in the buffer is not supposed to occur in the portable terminal 170.

The transmission unit 200 stores the content in a TCP packet, and then transmits the content to the portable terminal 170 through the SGSN/GGSN apparatus, the RNC apparatus, and the base station during the time segment T1 where the content is to be output from the transmission timing control unit 204.

On the other hand, during the time segment T−T1 and during the time segment T2, the transmission unit 200 does not transmit the TCP packet.

Various variations of the first exemplary embodiment with the above-mentioned configuration are possible. To take an example, FIG. 1 illustrates the configuration where one cache server is connected to one SGSN/GGSN apparatus. It may also be so configured that one cache server is connected to a plurality of the SGSN/GGSN apparatuses. Alternatively, it may also be so configured that a plurality of the cache servers are connected to one SGSN/GGSN apparatus.

The delivery server apparatus 121 may be configured to be connected to the cache server apparatuses 110_1 to 110_N.

Referring to FIG. 1, the SGSN/GGSN apparatus with the configuration in which an SGSN apparatus and a GGSN apparatus are integrated with each other is employed. It may also be so configured that the SGSN apparatus and the GGSN apparatus are separated. In the case of this configuration, it may be so configured that at least one cache server is connected to one of the SGSN apparatus and the GGSN apparatus.

Bandwidth estimation is not limited to the method using Equations (2) and (3). A different equation may also be used for the bandwidth estimation. The method of controlling the transmission timing is not limited to the method described above. A different method may also be used.

The portable terminal 170 may be a cellular phone, a smart phone, a tablet terminal, or a PC (Personal Computer) including a data communication card. Further, a different arbitrary terminal may also be employed if the terminal is a communication terminal that can communicate with a mobile 3G network, for example. This exemplary embodiment can solve a problem that even future data not necessary for current viewing by a viewer is delivered. When a period of time during which the throughput is below a delivery bit rate continues, data buffered in a terminal may be exhausted. Then a problem may arise that a moving image being reproduced freezes or the sound interrupts. According to this exemplary embodiment, this problem can be solved. According to this exemplary embodiment, unnecessary consumption of the bandwidth of a mobile network can be avoided, and delivery that accommodates variation of the throughput can be performed.

Variation Example of First Exemplary Embodiment

Figure 4:
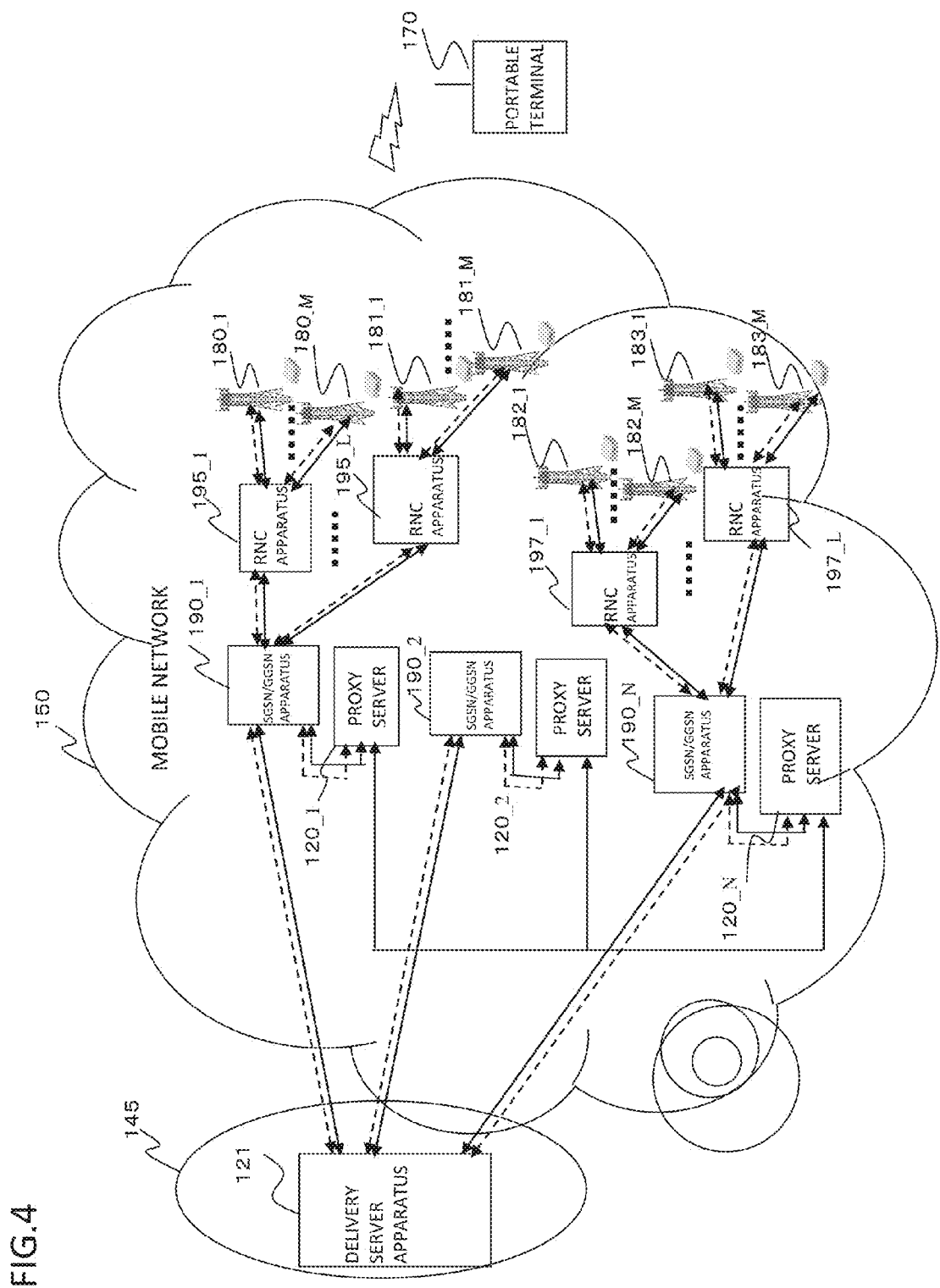
FIG. 4 is a diagram illustrating a variation example of the first exemplary embodiment.

Next, referring to FIG. 4, proxy servers 120_1 to 120_N are used in place of the cache servers, as a variation example of the first exemplary embodiment. Components in FIG. 4 that are assigned the same reference numerals as those in FIG. 1 perform the same operations as those in FIG. 1. Thus, description of these components will be omitted. Two types, which are a transparent type and a fully transparent type, may be herein assumed for the proxy server 120_1. In the case of the transparent type, a message signal from the portable terminal 170 is once terminated at the proxy server to analyze the message signal. Content temporarily stored in the proxy server is delivered to the portable terminal 170 from the proxy server. The proxy server makes a request or an access to the delivery server apparatus 121 through the SGS/GGSN apparatus, if necessary.

In the case of the fully transparent type, on the other hand, the URL of requested content included in a request signal from the portable terminal 170, an IP address for the delivery server on the Internet, an IP address for the portable terminal, and so forth are not changed. The proxy server does not terminate the signal from the portable terminal 170, and checks the header portion of the packet or the like to extract information of the URL of the requested content, the IP address of the portable terminal 170, and so forth, using a DPI (Deep Packet Inspection) technique (whereby control information of a packet communicated between a user of the Internet and a server is inspected by a third party). Then, when the requested content is cached in the proxy server, the proxy server issues an instruction to stop delivery to the delivery server apparatus 121 through the SGSN/GGSN apparatus. Then, the proxy server delivers the requested content from the proxy server. Since components of the proxy server are the same as those of the cache server in FIG. 2, detailed description of the components of the proxy server will be omitted.

Second Exemplary Embodiment

Figure 5:
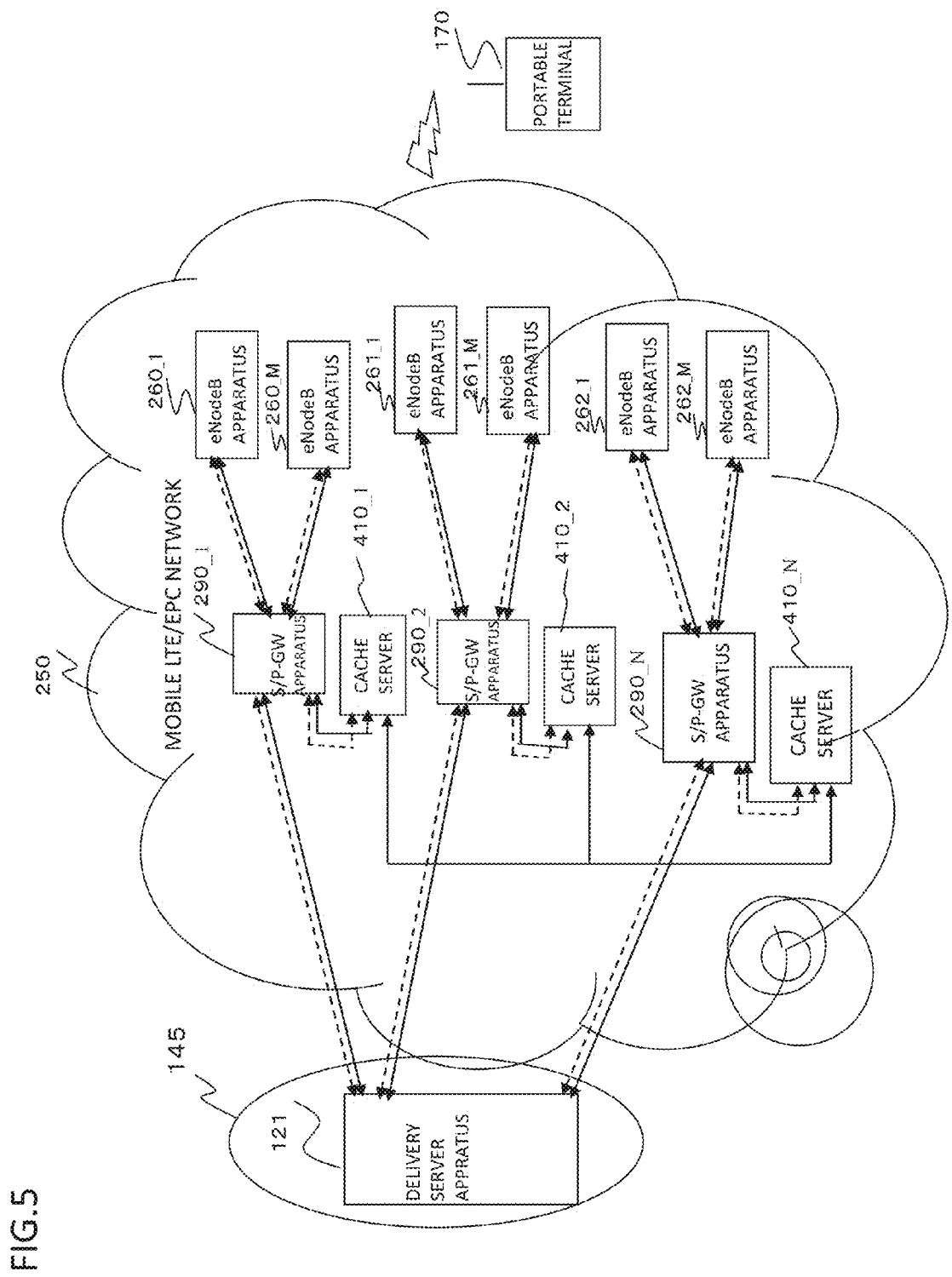
FIG. 5 is a diagram illustrating a connection configuration of a second exemplary embodiment of the present invention.

Next, a second exemplary embodiment of the present invention will be described. FIG. 5 is a diagram illustrating a configuration of the second exemplary embodiment of the present invention. Referring to FIG. 5, the configuration using an LTE (Long Term Evolution)/EPC (Evolved Packet Core) network 250 rather than the 3G mobile network 150 shown in FIG. 1 as a mobile network 250 is illustrated. The LTE/EPC network 250 is a 3.9th generation mobile network. In LTE, functions of a base station apparatus and an RNC apparatus are unified into a single component and are replaced by an eNodeB apparatus alone.

Further, S/P-GW (Serving/Packet Data-GateWay) apparatuses are connected to eNodeB (evolved NodeB) apparatuses. Each S/P-GW apparatus herein has a configuration in which an S-GW (Serving-Gateway) apparatus and a P-GW (Packet data network gateway) apparatus are integrated with each other.

FIG. 5 illustrates the configuration in which M units of the eNodeB apparatuses are connected to one unit of the S/P-GW apparatus. To take an example, eNodeB apparatuses 260_1 to 260_M are connected to an S/P-GW apparatus 290_1. One unit of cache server is connected to each S/P-GW apparatus. A cache server 410_1 is connected to the S/P-GW apparatus 290_1, for example. Cache servers are connected to each other so that contents may be associated.

When a portable terminal 170 describes an IP address for a delivery server apparatus 121 and then issues a connection request message for delivery, the eNodeB apparatus (one of the eNodeB apparatuses 261_1 to 261_M in the case of FIG. 5) in the area where the portable terminal 170 is currently located receives the connection request message. The one of the eNodeB apparatuses 261_1 to 261_M stores the connection request message, the IP address of the delivery server, an IP address for the portable terminal, and so forth in a GTP protocol payload portion, and transfers a GTP packet to the S/P-GW apparatus 290_2.

A cache server 410_1 has the same configuration as the configuration shown in FIG. 2. The connection destination of a control signal transmitting/reception unit 111 in this third exemplary embodiment is the S/P-GW apparatus 290_1. Accordingly, the cache server 410_1 receives the GTP packet with the connection request message and the IP addresses stored therein and location information on the portable terminal 170 from the S/P-GW apparatus 290_1. The above-mentioned communication is performed between each of the other cache servers 410_2 to 410_N and the S/P-GW apparatus connected to each of the other cache servers 410_2 to 410_N.

Various variations of the second exemplary embodiment are also possible. To take an example, referring to FIG. 5, it is so configured that the S/P-GW apparatus in which the S-GW apparatus and the P-GW apparatus are integrated with each other is employed. It may also be so configured that the S-GW apparatus and the P-GW apparatus are separated. In the case of this configuration, at least one unit of the cache servers may be connected to one of the S-GW apparatus and the P-GW apparatus.

The portable terminal 170 may be a cellular phone, a smart phone, a tablet terminal, or a PC including a data communication card. Further, any other terminal may be used if the terminal is a communication terminal capable of performing communication with a mobile 3.9G network, for example.

Variation Example of Second Exemplary Embodiment

Figure 6:
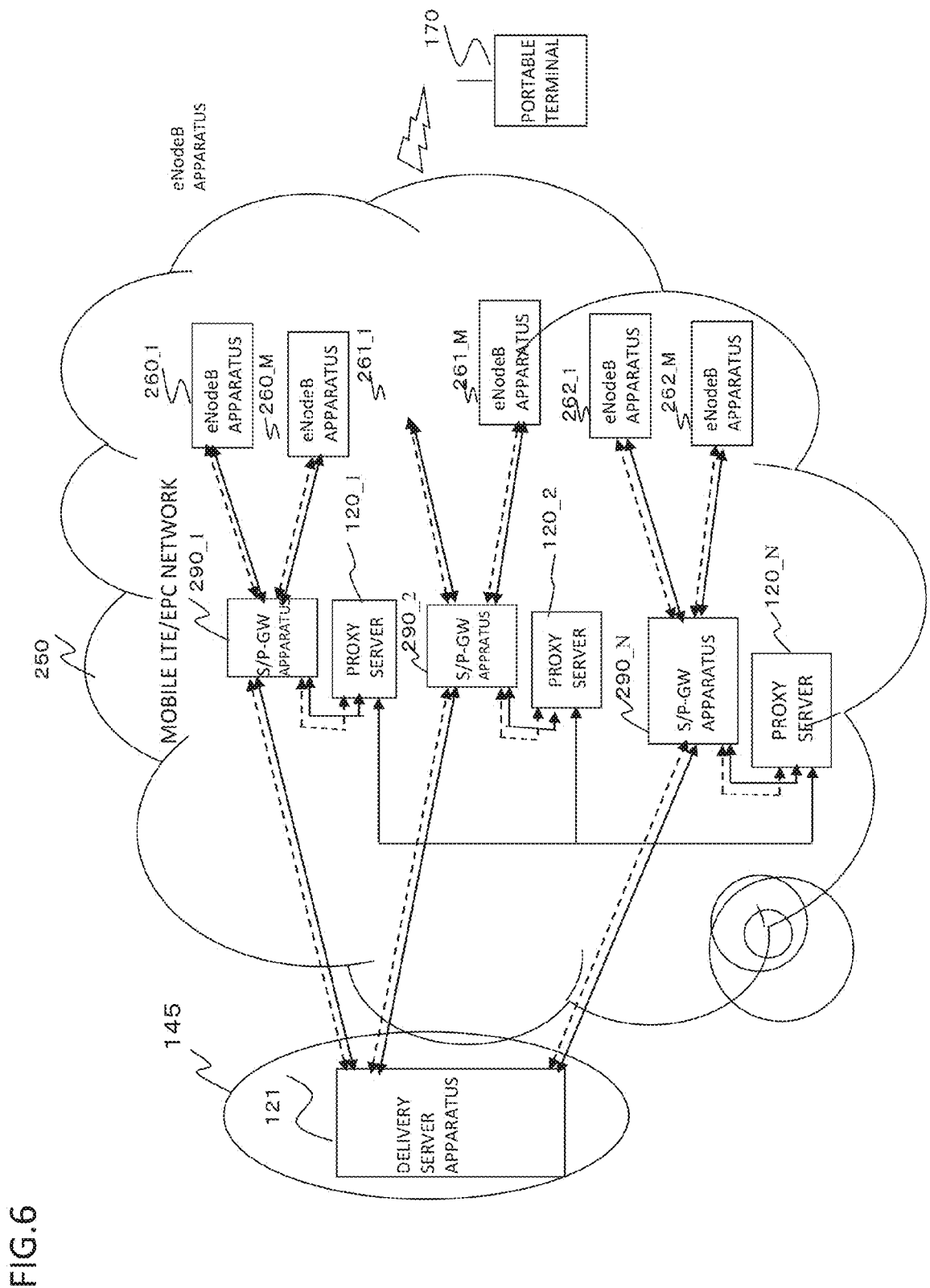
FIG. 6 is a diagram a variation example of the second exemplary embodiment.

FIG. 6 is a diagram illustrating a variation example of the second exemplary embodiment. In this variation example, proxy servers 120_1 to 120_N are included in place of the cache servers 410_1 to 410_N in FIG. 5. Components in FIG. 6 that are assigned the same reference numerals as those in FIG. 5 perform the same operations as those in FIG. 5. Thus, description of these components will be omitted. Since each proxy server in this variation example is set to have the same configuration as that described with reference to FIG. 4, description of the proxy server in this variation example will be omitted.

OPERATION AND EFFECT

According to the exemplary embodiments of the present invention, the following operations and effects are achieved.

According to the exemplary embodiments of the present invention, the content is delivered by controlling the delivery timing so that the bandwidth of the mobile network is not exceeded while estimating the bandwidth (throughput) of the mobile network. As a result, it follows that, even if a viewer stops viewing in the course of the viewing, the amount of data that has already been delivered is appropriate in terms of the estimated bandwidth. A problem that the limited bandwidth of a mobile network is unnecessarily consumed due to delivery of an excessive data amount as in the related art can be therefore solved.

The throughput of a mobile network temporally fluctuates according to the amount of traffic. According to the exemplary embodiments of the present invention, however, the content is delivered in the time segment during which the estimated bandwidth exceeds the delivery bit rate. For this reason, occurrence of a situation where a moving image being reproduced freezes or the sound interrupts in the portable terminal can be avoided.

Further, the above-mentioned operations and effects can be obtained without the need for modifying the terminal at all.

Modification and adjustment of each exemplary embodiment and each example are possible within the scope of the overall disclosure (including the claims) of the present invention and based on the basic technical concept of the present invention. Various combinations and selections of various disclosed elements are possible within the scope of the claims of the present invention. That is, the present invention naturally includes various variations and modifications that could be made by those skilled in the art according to the overall disclosure including the claims and the technical concept.

Though the above-mentioned exemplary embodiments are partly or wholly described in the following supplementary notes, the present invention is not limited to the following supplementary notes.

(Supplementary Note 1)
A delivery network system comprising:
 a plurality of servers on a mobile network,
 each of the servers being configured to function as a cache server or a proxy server, and including:
 a storage unit configured to temporarily store a replica of at least a portion of contents held by a delivery server, the delivery server being configured to deliver content on the Internet;
 a determination unit configured to determine the server holding requested content, using information included in a content request message from a communication terminal;
 a securing unit configured to read a file or a stream of the requested content from the determined server; and
 a delivery unit configured to estimate a bandwidth of the mobile network, based on a response signal or a congestion state notification signal from the communication terminal and transmit moving image content by controlling a timing of transmitting the read file or the read stream so as not to exceed the estimated bandwidth, when the requested content is the moving image content.

(Supplementary Note 2)
The delivery network system according to Supplementary Note 1, wherein
 the delivery unit includes:
 a reception unit configured to receive a packet of the response signal from the communication terminal through a predetermined node on the mobile network and notify information of the packet of the response signal to a bandwidth estimation unit, and to notify an instruction to reduce the bandwidth to the bandwidth estimation unit when receiving a congestion state notification signal from the communication terminal;
 the bandwidth estimation unit configured to receive information on a transmitted packet from a transmission unit and information on the packet of the response signal and associate the transmitted packet and the packet of the response signal, thereby measuring a response time of an nth packet (n being a predetermined positive integer) and estimating a bandwidth of the nth packet, and to set the bandwidth to zero when receiving a congestion state notification signal by the reception unit;
 a content acquisition unit configured to receive a URL (Uniform Resource Locator) of the content, receive from the determination unit an instruction to deliver the content, and search the storage unit for the requested content, thereby acquiring the file or the stream and bit rate information associated with the requested content;
 a transmission timing control unit configured to receive the bandwidth estimated by the bandwidth estimation unit, receive form the content acquisition unit the file or the stream of the requested content and a bit rate of the content, and control the timing of the transmission, based on a magnitude relationship between the bandwidth and the bit rate; and
 the transmission unit configured to store the content in a packet and transmit the packet to the communication terminal during a first time segment where the content is to be output and not to transmit the packet during a second time segment, under control by the transmission timing control unit.

(Supplementary Note 3)
The delivery network system according to Supplementary Note 1 or 2, wherein
 when the server that stores the content requested from the communication terminal is determined to be the local server as a result of the determination, the determination unit issues read and delivery instructions to the storage unit and the delivery unit;
 when the content requested from the communication terminal is stored in a different one of the servers, the determination unit informs the URL (Uniform Resource Locator) of the content requested from the terminal and an IP address for the different server to the securing unit, issues to the securing unit an instruction to secure the content from the different server, and the securing unit stores the replica of the requested content secured from the different server in the storage unit; and
 when neither of the local server and the different server stores the content requested from the communication terminal, the determination unit informs the URL of the content requested from the terminal and an IP address for the delivery server to the securing unit, issues to the securing unit an instruction to secure the content from the delivery server, and the securing unit stores in the storage unit the replica of the requested content secured from the delivery server.

(Supplementary Note 4)
The delivery network system according to any one of Supplementary Notes 1 to 3, wherein
 the server is connected to one of:
 a serving GPRS (General Packet Radio Service) support note (SGSN);
 a gateway GPRS support node (GGSN);
 a node into which the serving GPRS support node (SGSN) and the gateway GPRS support node (GGSN) are integrated;
 a serving gateway (S-GW);
 a packet data network gateway (P-GW);
 a node into which the serving gateway (S-GW) and the packet data network gateway (P-GW) are integrated; and
 the delivery server.

(Supplementary Note 5)
A server arranged on a mobile network and configured to function as a cache server or a proxy server, the server comprising:
 a storage unit configured to temporarily store a replica of at least a portion of contents held by a delivery server, the delivery server being configured to deliver content on the Internet;
 a determination unit configured to determine the server or a server holding requested content, using information included in a content request message from a communication terminal;
 a securing unit configured to read a file or a stream of the requested content from the determined server; and
 a delivery unit configured to estimate a bandwidth of the mobile network, based on a response signal or a congestion state notification signal from the communication terminal and transmit moving image content by controlling a timing of transmitting the read file or the read stream so as not to exceed the estimated bandwidth, when the requested content is the moving image content.

(Supplementary Note 6)
The server according to Supplementary Note 5, wherein
 the delivery unit includes:
 a reception unit configured to receive a packet of the response signal from the communication terminal through a predetermined node on the mobile network and notify information of the packet of the response signal to a bandwidth estimation unit, and to notify an instruction to reduce the bandwidth to the bandwidth estimation unit when receiving a congestion state notification signal from the communication terminal;

the bandwidth estimation unit configured to receive information on a transmitted packet from the transmission unit and information on the packet of the response signal and associate the transmitted packet and the packet of the response signal, thereby measuring a response time of an nth packet (n being a predetermined positive integer) and estimating a bandwidth of the nth packet, and to set the bandwidth to zero when receiving a congestion state notification signal by the reception unit;

a content acquisition unit configured to receive a URL (Uniform Resource Locator) of the content, receive from the determination unit an instruction to deliver the content, and search the storage unit for the requested content, thereby acquiring the file or the stream and bit rate information associated with the requested content;

a transmission timing control unit configured to receive the bandwidth estimated by the bandwidth estimation unit, receive from the content acquisition unit the file or the stream of the requested content and a bit rate of the content, and control the timing of the transmission, based on a magnitude relationship between the bandwidth and the bit rate; and the transmission unit configured to store the content in a packet and transmit the packet to the communication terminal during a first time segment where the content is to be output and not to transmit the packet during a second time segment, under control by the transmission timing control unit.

(Supplementary Note 7)

The server according to Supplementary Note 5 or 6, wherein when the server that stores the content requested from the terminal is determined to be the local server as a result of the determination, the determination unit issues read and delivery instructions to the storage unit and the delivery unit;

when the content requested from the terminal is stored in the server different from the server at which the determination has been made, the determination unit informs the URL (Uniform Resource Locator) of the content requested from the terminal and an IP address for the different server to the securing unit, issues to the securing unit an instruction to secure the content from the different server, and the securing unit stores the replica of the requested content secured from the different server in the storage unit; and when neither of the local server and the different server stores the content requested from the terminal, the determination unit informs the URL of the content requested from the communication terminal and an IP address for the delivery server to the securing unit, issues to the securing unit an instruction to secure the content from the delivery server, and the securing unit stores in the storage unit the replica of the requested content secured from the delivery server.

(Supplementary Note 8)

The server according to any one of Supplementary Note 5 to 7, wherein the server is connected to one of:

a serving GPRS (General Packet Radio Service) support note (SGSN);

a gateway GPRS support node (GGSN);

a node into which the serving GPRS support node (SGSN) and the gateway GPRS support node (GGSN) are integrated;

a serving gateway (S-GW);

a packet data network gateway (P-GW);

a node into which the serving gateway (S-GW) and the packet data network gateway (P-GW) are integrated; and the delivery server.

(Supplementary Note 9)

A delivery method by a serve configured to function as a cache server or a proxy server, a plurality of the servers being provided on a mobile network, the method comprising:

temporarily storing a replica of at least a portion of contents held by a delivery server, the delivery server being configured to deliver content on the Internet;

determining the server including requested content, using information included in a content request message from a communication terminal;

reading a file or a stream of the requested content from the determined server; and estimating a bandwidth of the mobile network, based on a response signal or a congestion state notification signal from the communication terminal and transmitting moving image content by controlling a timing of transmitting the read file or the read stream so as not to exceed the estimated bandwidth, when the requested content is the moving image content.

(Supplementary Note 10)

The delivery method according to Supplementary Note 9, wherein the server is connected to one of:

a serving GPRS (General Packet Radio Service) support note (SGSN);

a gateway GPRS support node (GGSN);

a node into which the serving GPRS support node (SGSN) and the gateway GPRS support node (GGSN) are integrated;

a serving gateway (S-GW);

a packet data network gateway (P-GW);

a node into which the serving gateway (S-GW) and the packet data network gateway (P-GW) are integrated; and the delivery server.

(Supplementary Note 11)

The delivery method according to Supplementary Note 9, comprising:

receiving a packet of the response signal from the communication terminal through a predetermined node on the mobile network or receiving the congestion state notification signal from the communication terminal;

associating a transmitted packet and the packet of the response signal, thereby measuring a response time of an nth packet (n being a predetermined positive integer) and estimating a bandwidth of the nth packet, while setting the bandwidth to zero when receiving a congestion state notification signal;

receiving a URL (Uniform Resource Locator) of the content, receiving an instruction to deliver the content, and searching the storage unit for the requested content, thereby acquiring the file or the stream and bit rate information associated with the requested content;

receiving the estimated bandwidth, receiving the file or the stream of the requested content and a bit rate of the content, and controlling the timing of the transmission, based on a magnitude relationship between the bandwidth and the bit rate; and storing the content in a packet and transmitting the packet to the communication terminal during a first time segment where the content is to be output and not transmitting the packet during a second time segment.

(Supplementary Note 12)
The delivery method according to Supplementary Note 11, comprising:

issuing an instruction to read from the storage unit and a delivery instruction when the server that stores the content requested from the terminal is determined to be the local server as a result of the determination;

when the content requested from the terminal is stored in a different one of the servers, issuing an instruction to secure the content from the different server based on the URL (Uniform Resource Locator) of the content requested from the terminal and an IP address for the different server, and storing the replica of the requested content secured from the different server in the storage unit; and when neither of the local server and the different server stores the content requested from the terminal, issuing an instruction to secure the content from the delivery server based on the URL of the content requested from the terminal and an IP address for the delivery server, and storing in the storage unit the replica of the requested content secured from the delivery server by a securing unit.

(Supplementary Note 13)
A program to cause a server that is connected to a network node connected to a mobile network, and that is configured to function as a cache server or a proxy server, to execute the processing comprising:

a process of temporarily storing a replica of at least a portion of contents held by a delivery server, the delivery server being configured to deliver content on the Internet;

a determination process of determining the server holding requested content, using information included in a content request message from a communication terminal;

a securing process of reading a file or a stream of the requested content from the determined server; and a delivery process of estimating a bandwidth of the mobile network, based on a response signal or a congestion state notification signal from the communication terminal and transmitting moving image content by controlling a timing of transmitting the read file or the read stream so as not to exceed the estimated bandwidth, when the requested content is the moving image content.

(Supplementary Note 14)
The program according to Supplementary Note 13, wherein the delivery process includes:

a reception process of receiving a packet of the response signal from the communication terminal through a predetermined node on the mobile network and notifying information on the packet of the response signal for a bandwidth estimation process and notifying an instruction to reduce the bandwidth to the bandwidth estimation process when receiving from the communication terminal the congestion state notification signal;

the bandwidth estimation process of receiving information on a transmitted packet and the information on the packet of the response signal and associating the transmitted packet and the packet of the response signal, thereby measuring a response time of an nth packet (n being a predetermined positive integer) and estimating a bandwidth of the nth packet, while setting the bandwidth to zero when receiving a congestion state notification signal by the reception unit;

a content acquisition process of receiving a URL (Uniform Resource Locator) of the content, receiving from the determination unit an instruction to deliver the content, and searching the storage unit for the requested content, thereby acquiring the file or the stream and bit rate information associated with the requested content;

a transmission timing control process of receiving the bandwidth estimated by the bandwidth estimation unit, receiving the file or the stream of the requested content and a bit rate of the content acquired in the content acquisition process, and controlling the timing of the transmission, based on a magnitude relationship between the bandwidth and the bit rate; and a transmission process of storing the content in a packet and transmit the packet to the communication terminal during a first time segment where the content is to be output and not transmitting the packet during a second time segment, under control by the transmission timing control process.

(Supplementary Note 15)
The program according to Supplementary Note 13 or 14, wherein:

when the server that stores in the storage unit the content requested from the communication terminal is determined to be the local server as a result of the determination, read and delivery instructions are issued to the storage unit and the delivery process in the determination process;

when the content requested from the communication terminal is stored in a different one of the servers, a URL (Uniform Resource Locator) of the content requested from the terminal and an IP address for the different server are informed for the securing process and an instruction to secure the content from the different server is issued for the securing process, in the determination process;

in the securing process, the replica of the requested content secured from the different server is stored in the storage unit; and when neither of the local server and the different server stores the content requested from the communication terminal, the URL of the content requested from the terminal and an IP address for the delivery server are informed and an instruction to secure the content from the delivery server is issued for the securing process, in the determination process, and the replica of the requested content secured from the delivery server is stored in the storage unit in the securing process.

(Supplementary Note 16)
The program according to any one of Supplementary Notes 13 to 15, wherein the server is connected to one of:

a serving GPRS (General Packet Radio Service) support note (SGSN);

a gateway GPRS support node (GGSN);

a node into which the serving GPRS support node (SGSN) and the gateway GPRS support node (GGSN) are integrated;

a serving gateway (S-GW);

a packet data network gateway (P-GW);

a node into which the serving gateway (S-GW) and the packet data network gateway (P-GW) are integrated; and the delivery server.

Modification and adjustment of each exemplary embodiment and each example are possible within the scope of the overall disclosure (including the claims) of the present invention and based on the technical concept of the present invention. Various combinations and selections of various disclosed elements are possible within the scope of the claims of the present invention. That is, the present invention naturally includes various variations and modifications that could be made by those skilled in the art according to the overall disclosure including the claims and the technical concept.

What is claimed is:

1. A delivery network system comprising:
a plurality of servers arranged on a mobile network, each of the plurality of servers being configured to function as a cache server or a proxy server, a first server among the plurality of servers comprising:
at least one memory operable to store program code;
at least one processor operable to read the program code and operate as instructed by the program code, the program code including:
storage code configured to cause the at least one processor to temporarily store, in a storage, a replica of at least a portion of contents held by a delivery server, the delivery server being configured to deliver content on the Internet;
determination code configured to cause the at least one processor to receive a list of the content stored in the first server or a list of content stored in a second server, different from the first server, among the plurality of servers and determine a server that stores requested content, using information included in a content request message from a communication terminal;
securing code configured to cause the at least one processor to read a file or a stream of the requested content from the determined server; and
delivery code configured to cause the at least one processor to estimate a bandwidth of the mobile network, based on information on a transmitted packet and a response signal or a congestion state notification signal from the communication terminal, and transmit moving image content by controlling a timing of transmitting the read file or the read stream based on a comparison between a bit rate of the read file or the read stream and the estimated bandwidth so as not to exceed the estimated bandwidth, when the requested content is the moving image content,
wherein the delivery code causes the at least one processor to generate an instruction to reduce the estimated bandwidth when receiving the congestion state notification signal from the communication terminal, and control the timing of transmitting based on a comparison between the bit rate of the read file or the read stream and the reduced estimated bandwidth.

2. The delivery network system according to claim 1, wherein the program code further includes:
reception code configured to cause the at least one processor to receive a packet of the response signal from the communication terminal through a predetermined node on the mobile network and transmit information of the packet of the response signal;
bandwidth estimation code configured to cause the at least one processor to receive information on the transmitted packet and information on the packet of the response signal, associate the transmitted packet and the packet of the response signal to measure a response time of an nth packet (n being a predetermined positive integer), and estimate a bandwidth of the nth packet, the bandwidth of the nth packet being set to zero when receiving a congestion state notification signal by the reception code;
content acquisition code configured to cause the at least one processor to receive a URL (Uniform Resource Locator) of the content, receive an instruction to deliver the content based on a result of determination by the determination code, and search the storage for the requested content to acquire the file or the stream and bit rate information associated with the requested content;
transmission timing control code configured to cause the at least one processor to receive the bandwidth estimated by the bandwidth estimation code, receive the file or the stream of the requested content and the bit rate information of the content acquired by the content acquisition code, and control the timing of the transmission, based on a magnitude relationship between the bandwidth and the bit rate; and
transmission code configured to cause the at least one processor to store the content in a packet and transmit the packet to the communication terminal during a first time segment where the content is to be output and not to transmit the packet during a second time segment, under control by the transmission timing control code.

3. The delivery network system according to claim 1, wherein when the server that stores in the storage the content requested from the communication terminal is determined to be the first server as a result of the determination, the determination code configured to cause the at least one processor to issue read and delivery instructions to the storage and the delivery code;
when the content requested from the communication terminal is stored in the second server among the plurality of servers, the determination code causes the at least one processor to inform the URL (Uniform Resource Locator) of the content requested from the communication terminal and an IP address for the second server to the securing code, issue to the securing code an instruction to secure the content from the second server, and the securing code causes the at least one processor to store the replica of the requested content secured from the second server in the storage; and
when neither of the first server and the second server stores the content requested from the communication terminal, the determination code causes the at least one processor to inform the URL of the content requested from the communication terminal and an IP address for the delivery server to the securing code, issue to the securing code an instruction to secure the content from the delivery server, and the securing code causes the at least one processor to store in the storage the replica of the requested content secured from the delivery server.

4. The delivery network system according to claim 1, wherein the first server is connected to one of:
a serving GPRS (General Packet Radio Service) support note (SGSN);
a gateway GPRS support node (GGSN);
a node into which the serving GPRS support node (SGSN) and the gateway GPRS support node (GGSN) are integrated;
a serving gateway (S-GW);
a packet data network gateway (P-GW);
a node into which the serving gateway (S-GW) and the packet data network gateway (P-GW) are integrated; and
the delivery server.

5. A server arranged on a mobile network and configured to function as a cache server or a proxy server, the server comprising:
at least one memory operable to store program code;
at least one processor operable to read the program code and operate as instructed by the program code, the program code including:

a storage configured to cause the at least one processor to temporarily store in a storage, a replica of at least a portion of contents held by a delivery server, the delivery server being configured to deliver content on the Internet;

determination configured to cause the at least one processor to receive a list of the content stored in storage of the server or a list of content stored in a second server, different from the server, among a plurality of servers and determine the server or the second server that stores requested content, using information included in a content request message from a communication terminal;

securing code configured to cause the at least one processor to read a file or a stream of the requested content from the determined server; and delivery code configured to cause the at least one processor to estimate a bandwidth of the mobile network, based on information on a transmitted packet and a response signal or a congestion state notification signal from the communication terminal and transmit moving image content by controlling a timing of transmitting the read file or the read stream based on a comparison between a bit rate of the read file or the read stream and the estimated bandwidth so as not to exceed the estimated bandwidth, when the requested content is the moving image content, wherein the delivery code causes the at least one processor to generate an instruction to reduce the estimated bandwidth when receiving the congestion state notification signal from the communication terminal, and control the timing of transmitting based on a comparison between the bit rate of the read file or the read stream and the reduced estimated bandwidth.

6. The server according to claim 5, wherein the program code further includes:

reception code configured to cause the at least one processor to receive a packet of the response signal from the communication terminal through a predetermined node on the mobile network and transmit information of the packet of the response signal;

bandwidth estimation code configured to cause the at least one processor to receive information on the transmitted packet and information on the packet of the response signal, associate the transmitted packet and the packet of the response signal, measure a response time of an nth packet (n being a predetermined positive integer) and estimate a bandwidth of the nth packet, the bandwidth of the nth packet being set to zero when receiving the congestion state notification signal;

content acquisition code configured to cause the at least one processor to receive a URL (Uniform Resource Locator) of the content, receive an instruction to deliver the content based on a result of determination by the determination code, and search the storage for the requested content, to acquire the file or the stream and bit rate information associated with the requested content;

transmission timing control code configured to cause the at least one processor to receive the bandwidth estimated by the bandwidth estimation code, receive the file or the stream of the requested content and a bit rate of the content from the content acquisition code, and control the timing of the transmission, based on a magnitude relationship between the bandwidth and the bit rate; and transmission code configured to cause the at least one processor to store the content in a packet and transmit the packet to the communication terminal during a first time segment where the content is to be output and not to transmit the packet during a second time segment, under control by the transmission timing control code.

7. The server according to claim 5, wherein when the server is determined to store in the storage the content requested from the communication terminal as a result of the determination, the determination code causes the at least one processor to issue read and delivery instructions to the storage and the delivery code;

when the content requested from the communication terminal is stored in the second server different from the server at which the determination has been made, the determination code causes the at least one processor to inform the URL (Uniform Resource Locator) of the content requested from the communication terminal and an IP address for the second server to the securing code, issue to the securing code an instruction to secure the content from the second server, and the securing code causes the at least one processor to store the replica of the requested content secured from the second server in the storage; and when neither of the server and the second server stores the content requested from the communication terminal, the determination code causes the at least one processor to inform the URL of the content requested from the communication terminal and an IP address for the delivery server to the securing code, issue to the securing code an instruction to secure the content from the delivery server, and the securing code causes the at least one processor to store in the storage the replica of the requested content secured from the delivery server.

8. The server according to claim 5, wherein the server is connected to one of:

a serving GPRS (General Packet Radio Service) support note (SGSN);

a gateway GPRS support node (GGSN);

a node into which the serving GPRS support node (SGSN) and the gateway GPRS support node (GGSN) are integrated;

a serving gateway (S-GW);

a packet data network gateway (P-GW);

a node into which the serving gateway (S-GW) and the packet data network gateway (P-GW) are integrated; and the delivery server.

9. A delivery method by a server configured to function as a cache server or a proxy server, a plurality of the servers being provided on a mobile network, the method comprising:

temporarily storing a replica of at least a portion of contents held by a delivery server, the delivery server being configured to deliver content on the Internet;

receiving a list of the content stored in a first server or a list of content stored in a second server, different from the first server, among the plurality of servers and determining a server that stores requested content, using information included in a content request message from a communication terminal;

reading a file or a stream of the requested content from the determined server; and when the requested content is moving image content, estimating a bandwidth of the mobile network, based on information on a transmitted packet and a response signal or a congestion state notification signal from the communication terminal and transmitting the moving image content by controlling a timing of transmitting the read file or the read stream based on a comparison between a bit rate of the read file or the read stream and the estimated bandwidth so as not to exceed the estimated bandwidth, wherein the estimating comprises generating an instruction to reduce the estimated bandwidth when receiving the congestion state notification signal from the communication terminal, and the controlling the timing of transmitting comprises controlling the timing of transmitting based on a comparison between the bit rate of the read file or the read stream and the reduced estimated bandwidth.

10. The delivery method according to claim 9, wherein the first server is connected to one of:
a serving GPRS (General Packet Radio Service) support note (SGSN);
a gateway GPRS support node (GGSN);
a node into which the serving GPRS support node (SGSN) and the gateway GPRS support node (GGSN) are integrated;
a serving gateway (S-GW);
a packet data network gateway (P-GW);
a node into which the serving gateway (S-GW) and the packet data network gateway (P-GW) are integrated; and
the delivery server.

11. The delivery method according to claim 9, comprising:
receiving a packet of the response signal from the communication terminal through a predetermined node on the mobile network or receiving the congestion state notification signal from the communication terminal;
associating a transmitted packet and the packet of the response signal, thereby measuring a response time of an nth packet (n being a predetermined positive integer) and estimating a bandwidth of the nth packet, while setting the bandwidth to zero when receiving the congestion state notification signal from the communication terminal;
receiving a URL (Uniform Resource Locator) of the content, receiving an instruction to deliver the content, and searching the storage for the requested content, thereby acquiring the file or the stream and bit rate information associated with the requested content;
receiving the estimated bandwidth, receiving the file or the stream of the requested content and a bit rate of the content, and controlling the timing of the transmission, based on a magnitude relationship between the bandwidth and the bit rate; and
storing the content in a packet and transmitting the packet to the communication terminal during a first time segment where the content is to be output and not transmitting the packet during a second time segment.

12. The delivery method according to claim 11, comprising:
issuing an instruction to read from the storage and a delivery instruction when the server that stores the content requested from the terminal is determined to be the first server as a result of the determination;
when the content requested from the terminal is stored in the second server among the plurality of servers, issuing an instruction to secure the content from the second server based on the URL (Uniform Resource Locator) of the content requested from the terminal and an IP address for the second server, and storing the replica of the requested content secured from the second server in the storage; and
when neither of the first server and the second server stores the content requested from the terminal, issuing an instruction to secure the content from the delivery server based on the URL of the content requested from the terminal and an IP address for the delivery server, and storing in the storage the replica of the requested content secured from the delivery server.

* * * * *